(12) United States Patent
Harp

(10) Patent No.: US 11,973,208 B1
(45) Date of Patent: Apr. 30, 2024

(54) PARALLEL MASS TRANSFER ELECTRIC POWER GENERATOR SYSTEM AND PROCESS

(71) Applicant: Jon Scott Harp, Wailuku, HI (US)

(72) Inventor: Jon Scott Harp, Wailuku, HI (US)

( * ) Notice: Subject to any disclaimer, the term of this patent is extended or adjusted under 35 U.S.C. 154(b) by 448 days.

(21) Appl. No.: 17/192,348

(22) Filed: Mar. 4, 2021

(51) Int. Cl.
*H01M 16/00* (2006.01)
*C25B 1/04* (2021.01)
*F03B 17/00* (2006.01)
*H01M 8/22* (2006.01)
*H01M 50/77* (2021.01)

(52) U.S. Cl.
CPC ............ *H01M 16/003* (2013.01); *C25B 1/04* (2013.01); *F03B 17/005* (2013.01); *H01M 8/22* (2013.01); *H01M 50/77* (2021.01); *H01M 2250/10* (2013.01); *H01M 2250/407* (2013.01)

(58) Field of Classification Search
CPC .. H01M 16/00; H01M 16/003; H01M 16/006; H01M 2250/40; H01M 2250/402; H01M 2250/407; H01M 8/22; C25B 1/04; F03B 17/005
See application file for complete search history.

(56) References Cited

U.S. PATENT DOCUMENTS

| | | | | |
|---|---|---|---|---|
| 4,284,899 A | * | 8/1981 | Bendiks | ............. F03B 13/06 290/1 R |
| 7,000,395 B2 | | 2/2006 | Wai | |
| 2016/0076509 A1 | * | 3/2016 | Im | ............. H01M 8/0656 60/398 |

FOREIGN PATENT DOCUMENTS

| | | |
|---|---|---|
| AU | 2013223862 B2 | 2/2018 |
| CN | 103618100 B | 2/2016 |
| ES | 2609978 A1 | 11/2017 |

OTHER PUBLICATIONS

IN201306087 NPL English translation (part 1). Gutta. India. Jan. 10, 2014 (Year: 2014).*
IN201306087 NPL English translation (part 2). Gutta. India. Jan. 10, 2014 (Year: 2014).*

* cited by examiner

*Primary Examiner* — Christopher P Domone
(74) *Attorney, Agent, or Firm* — Richard Eldredge; Leavitt and Eldredge Law Firm

(57) ABSTRACT

A system and method to transfer and circulate energy and mass in a closed cycle, includes a machine to efficiently harvest energy potential to generate electrical power, operate a self-charging virtual battery, and produce pure oxygen based upon the application of the scientific principles of electrochemistry and gravitation by combining existing technological components and associated functions.

4 Claims, 8 Drawing Sheets

PARALLEL MASS TRANSFER ELECTRIC POWER GENERATOR SYSTEM AND PROCESS

BACKGROUND

1. Field of the Invention

The present invention relates generally to energy circulation systems, and more specifically, to a system and process to efficiently transfer and circulate energy and mass in a closed cycle and a machine to efficiently harvest energy potential to generate electrical power, operate a self-charging battery, and produce pure oxygen (for industrial-scale power generation and manufacturing, carbon emission elimination and carbon capture processes) based upon the application of the scientific principles of electrochemistry and gravitation by combining existing technological components and associated functions.

2. Description of Related Art

Energy generation systems are well known in the art and provide a means for the harvesting and generating of energy for use in various applications, such as for household or industrial purposes. Conventional methods may utilize fossil fuels or may be inefficient and create unnecessary waste. Accordingly, although great strides have been made in the area of energy generation systems, many shortcomings remain.

It is therefore an object of the present invention to provide for a process and machine that: generate electricity without the combustion of fossil fuels; continuously recycle distilled liquid water feedstock; maintain continuous energy potential for virtual power storage; generate pure oxygen and electric power required for decarbonizing steelmaking, cement and fertilizer production (and other uses); and significantly reduce the need for massive resource and energy deployment for the installation of solar and wind technology infrastructures, thereby avoiding associated environmental/weather impacts and low-return financial investments.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
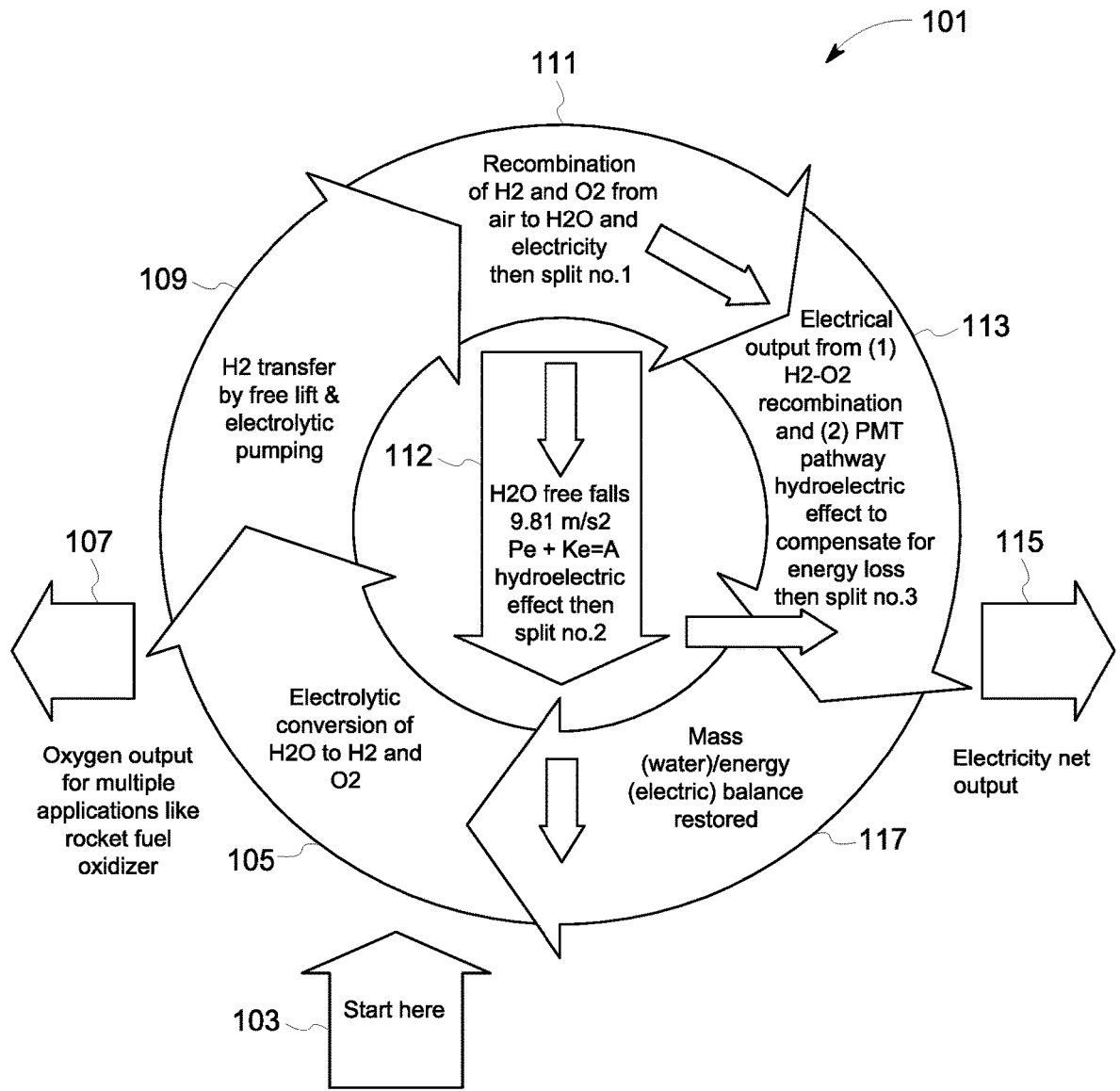
FIG. 1 is a diagram of a parallel mass transfer cycle in accordance with the method of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints or desired scale and magnitude of system output, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional energy generation systems. Specifically, the present invention provides for a system and process that efficiently transfer and circulate energy and mass in a closed cycle and a machine to efficiently harvest energy potential to generate electrical power. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-10 depict various views of a system and process of the present invention. It should be appreciated that the present invention provides for benefits over the prior art as previously discussed.

The system of the present invention includes main components comprising, a lower reservoir 213 (FIG. 3A), an upper reservoir 211 (FIG. 8), an electrolysis unit 205 (FIG. 3A), a hydrogen gas transfer pipe system 313 (FIG. 3A), a fuel cell unit 206 (FIG. 6), a penstock 305 (FIG. 3A, FIG. 3B, FIG. 8, FIG. 9), a hydraulic turbine 307 (FIG. 3A) with a three-phase DC generator 309 (FIG. 3A); and a transformer 311 (FIG. 3A) connected to the three-phase DC generator.

The system of the present invention begins with a prepared state. The prepared state is complete when the lower reservoir and upper reservoir are both filled in equal volumes to a required maximum capacity with a feedstock of distilled water. It should be appreciated and understood that the distilled water volume is directly proportional to the desired electrical output of the invention.

In FIG. 1, a process cycle 101 of the present invention is shown. As shown, the process starts at arrow 103. The first phase includes the electrolytic conversion of $H_2O$ to $H_2$ and $O_2$, as shown with 105. It should be appreciated that electric current (DC) from an outside source is input into the electrolysis unit for the purpose of system ignition.

From this phase, oxygen is output which can then be utilized for various applications, such as rocket fuel oxidizer, as shown with 107, and the $H_2$ is transferred by free lift and electrolytic pumping, as shown with 109. Next, as shown with 111, there is the recombination of $H_2$ and $O_2$ from air to $H_2O$ and electricity. Here the process cycle is then split into separate yet simultaneous flows of mass (water) and energy (electric current). This then causes two separate pathways 112, 113 as shown. The first 112 is where $H_2O$ free falls generating a hydroelectric effect, and the second 113 is where electrical output from $H_2$—$O_2$ recombination occurs. The combination of electrical outputs from 112 and 113 compensate for energy loss between the electrolytic conversion 105 and $H_2$—$O_2$ recombination 111 (with the loss manifested in a heat byproduct resulting in a 20% reduction of electrical input at 105. The flow as shown in 112 is given name the Parallel Mass Transfer Pathway. It is the novel characteristic of the system described herein. From here, as shown with 115, there is net electricity output. The cycle then continues with the mass (water) and energy (electric) balance restored, as shown with 117. As shown, the system is cyclical in continuous sequences of one second for each step 105 through 117, which provides for a high energy/mass efficiency gain resulting in net electrical output (and useful byproducts oxygen and heat).

The energy/mass transfer and energy/mass balance restoration cycle achieved at 117 create a virtual battery with a constantly charged energy potential thus eliminating the need for replications of mass potential energy in multiple storage units (and energy expenditure for charging, recharging or disposal of traditional batteries) or the need for excessive use of space for placement of energy storage units.

It should be understood that the system recycles its own energy internally using gravitational field potential, hydroelectric output, and electrochemical transformations. Accordingly, electric current from the outside is no longer necessary after the first cycle is completed.

Figure 2:
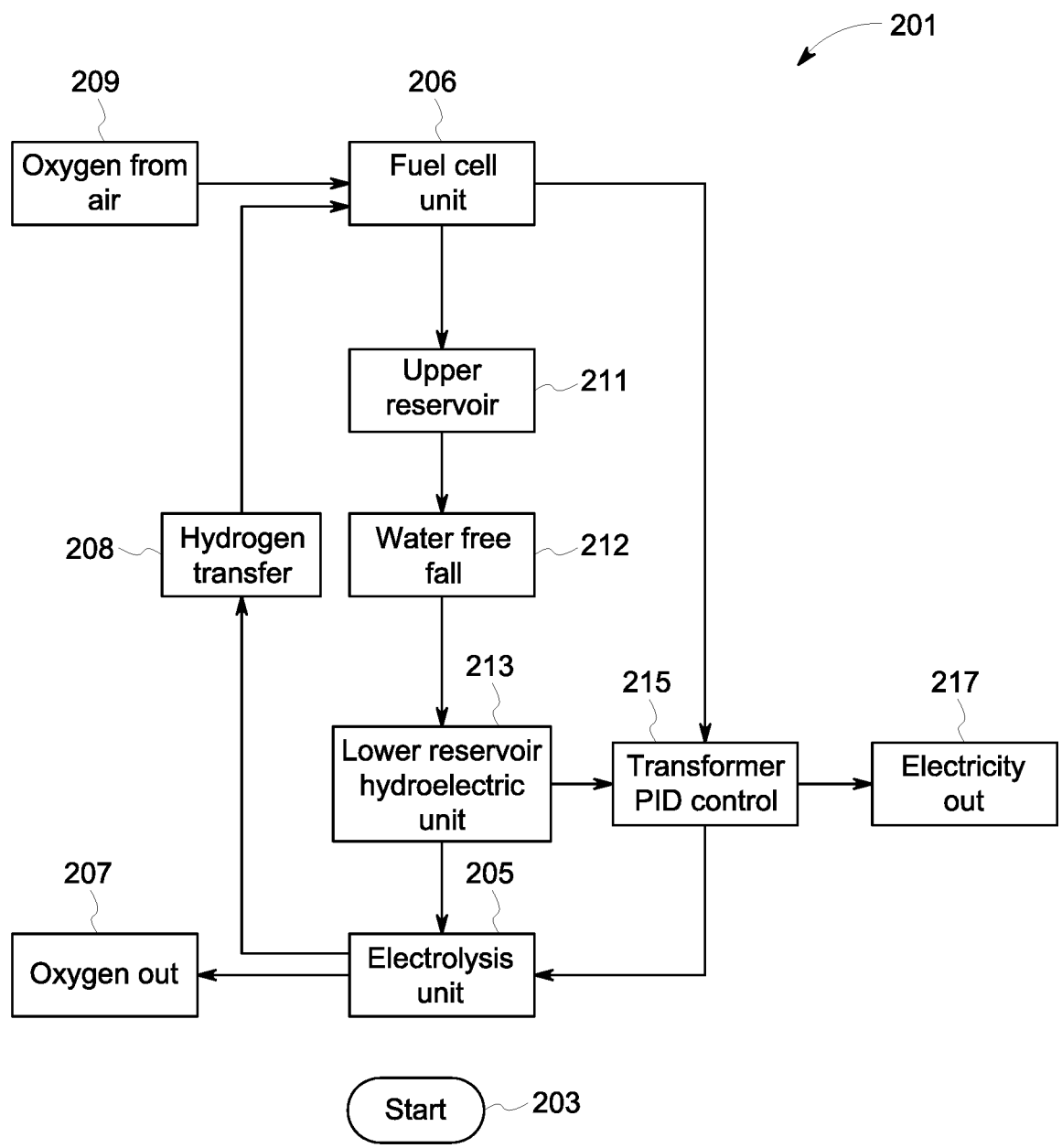
FIG. 2 is a diagram of a main process flow in accordance with the method of a preferred embodiment of the present invention.

In FIG. 2, another diagram 201 further depicts a process flow propelled by the components of the system of the present invention. As shown, the system begins at 203 with an electrolysis unit 205 which provides the oxygen output 207 and provides hydrogen transfer 208 in communication with a fuel cell unit 206. The fuel cell unit 206 receives oxygen from the air 209 and upon conversion to water with hydrogen is in further communication with an upper reservoir 211 with water byproduct which is transferred through a penstock 212 in communication with a hydroelectric unit and lower reservoir 213 which transfers back to the electrolysis unit 205. As shown, the fuel cell unit 206 is separately and simultaneously in communication with a transformer and PID process controller 215, whereby net electricity output 217 is provided and mass/energy balance is achieved to continue the process at 205.

Figure 3A:
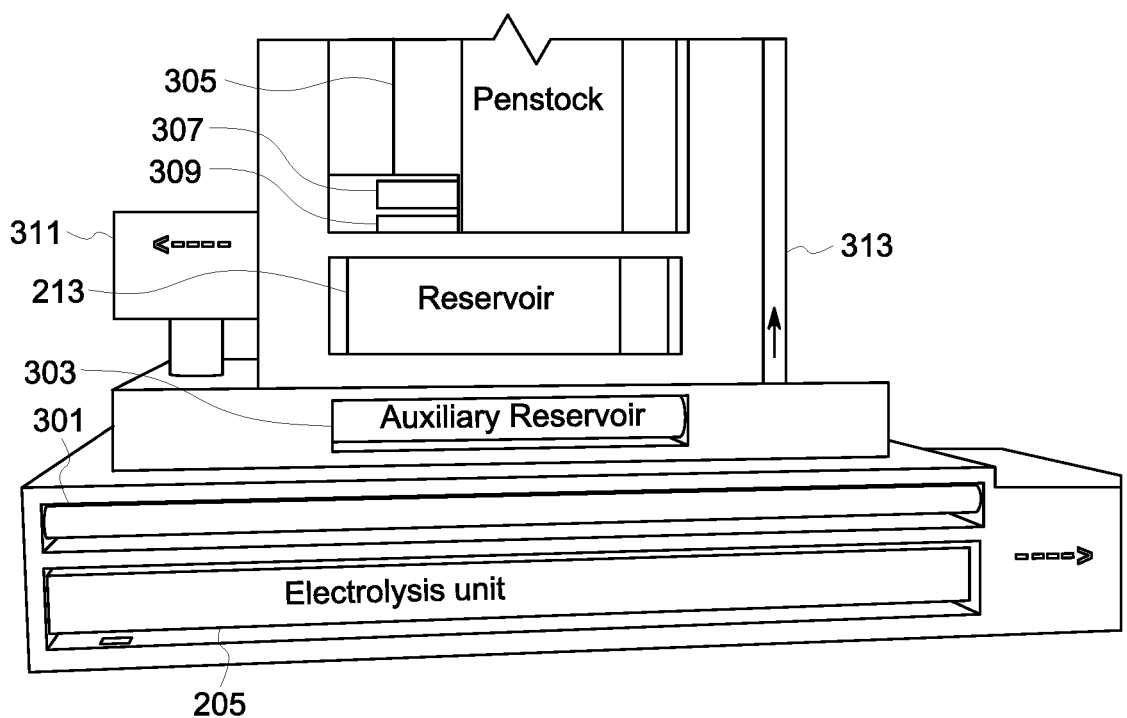
FIG. 3A is a partial view of the system of the present invention showing a lower section.
Figure 3B:
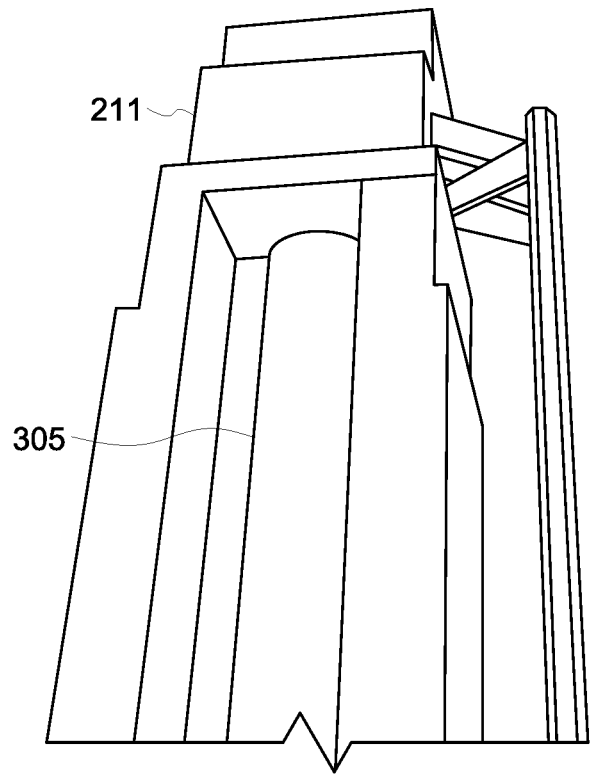
FIG. 3B is a partial view of the system of the present invention showing an upper section.

In FIGS. 3A and 3B, partial views of the top and bottom portions of the system of the present invention are shown.

Shown in FIG. 3A is the electrolysis unit 205 is housed adjacent to a feedstock distribution unit 301. As shown, the system of the present invention will include the lower reservoir 213 and may include an auxiliary reservoir 303 (used in system startup). Again, it should be appreciated that the electrolysis unit 205 will receive water from the reservoir and/or auxiliary reservoir at the beginning of the process. A penstock 305 with a turbine 307 and generator 309 are further provided, wherein energy is transmitted to a grid or other application via a transformer 311. The system further includes $H_2$ transfer pipes with coiled interiors for gas velocity modulation 313.

With an elementary electric charge of 0.007297541 eV, the electrolysis unit produces hydrogen at a rate of 1 mol for every 9 mols of distilled water per second. The water-to-hydrogen conversion ratio of 9:1 is a constant and is an important ratio later in the process. With these conversion constants, a continuous current of 20 Mw, for example, would convert 9,000 liters of water into 1,110 kgs of hydrogen gas per second.

As shown in FIG. 3B, the system further includes the upper reservoir 211 in communication with the lower reservoir via a penstock 305, wherein gravitational force is utilized to transfer water from the upper reservoir to the lower.

Figure 4:
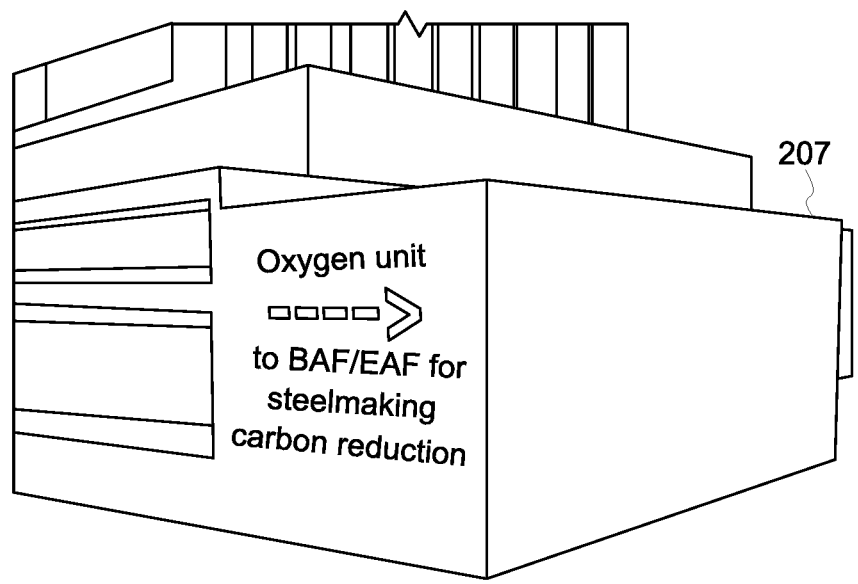
FIG. 4 is a partial view of the system of the present invention showing an oxygen unit of the present invention.

In FIG. 4, the oxygen output 207 is shown. In this electrolytic process, liberated highly purified oxygen is released through oxygen piping and handled for use in BOF (basic oxygen furnaces) or EAF (electric arc furnaces) to decarbonize the steelmaking process. Oxygen is available for other industrial-scale manufacturing and chemical processes, carbon capture processes, medical applications or as oxidizer for rocket propellant.

Figure 5:
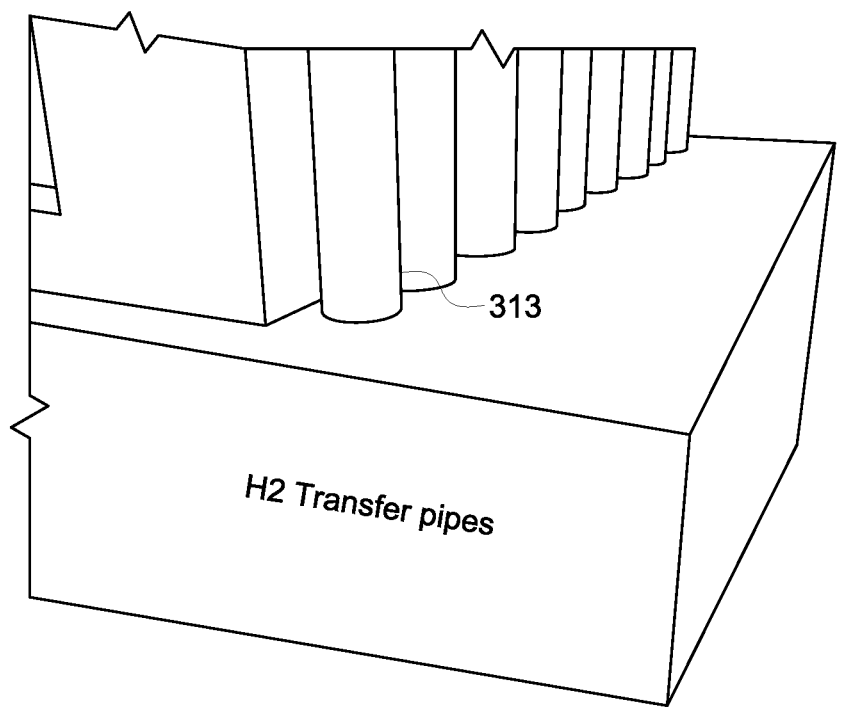
FIG. 5 is a partial view of the system of the present invention showing a hydrogen gas transfer unit of the present invention.

In FIG. 5, the $H_2$ transfer pipes 313 are shown. Liberated hydrogen gas is transmitted upward by a combination of free lift and electrolytic process-enabled pumping action from the Electrolysis Unit and transferred by coil transfer conduits to the Fuel Cell Unit at the top of the system. It should be appreciated that coil transfer conduits are employed to regulate the flow of hydrogen to synchronize with the velocity of the free-fall of water.

Figure 6:
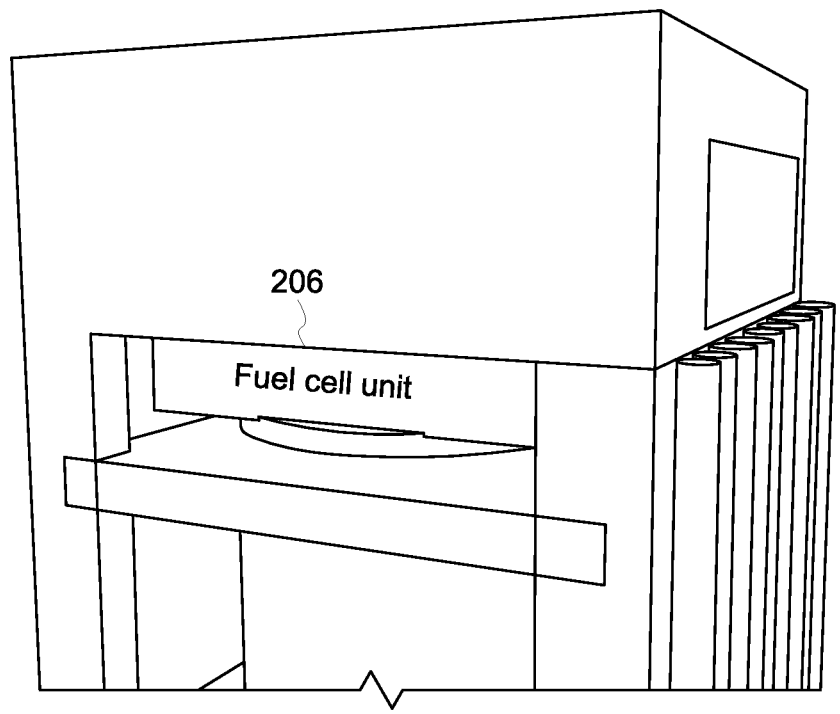
FIG. 6 is a partial view of the system of the present invention showing a fuel cell unit of the present invention.
Figure 7:
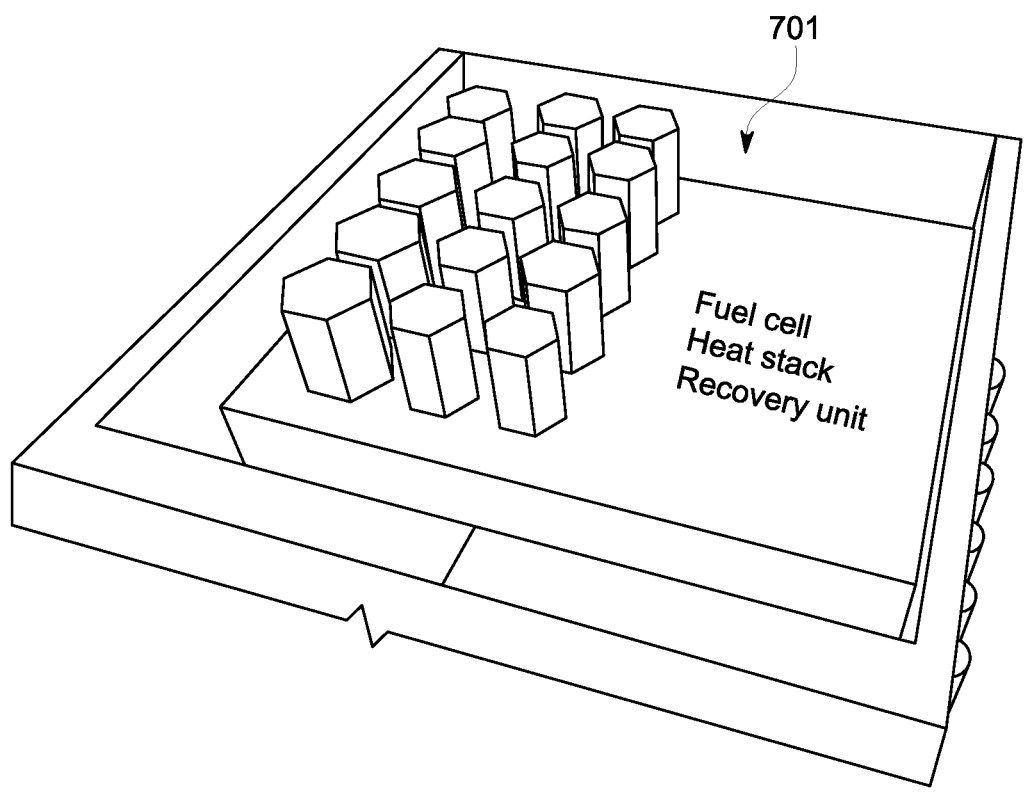
FIG. 7 is a partial view of the system of the present invention showing a fuel cell heat stack recovery unit of the present invention.

In FIG. 6, the fuel cell unit 206 is shown. In FIG. 7, a fuel cell heat stack recovery unit 701 is shown. Hydrogen gas from the coil transfer conduits and oxygen gas from the air enter the fuel cell unit. With the 9:1 water-to-hydrogen ratio, 1,110 kg of hydrogen (combined with oxygen from the air) produces 9,000 liters of water per second. Simultaneously, the fuel cell generates DC electricity which is transferred to the transformer and combined with electrical output from the hydroelectric generator to control, balance and recycle the 20 Mw/sec to the Electrolysis Unit while the net electrical output is put onto the grid or transmitted to other industrial processes.

Figure 8:
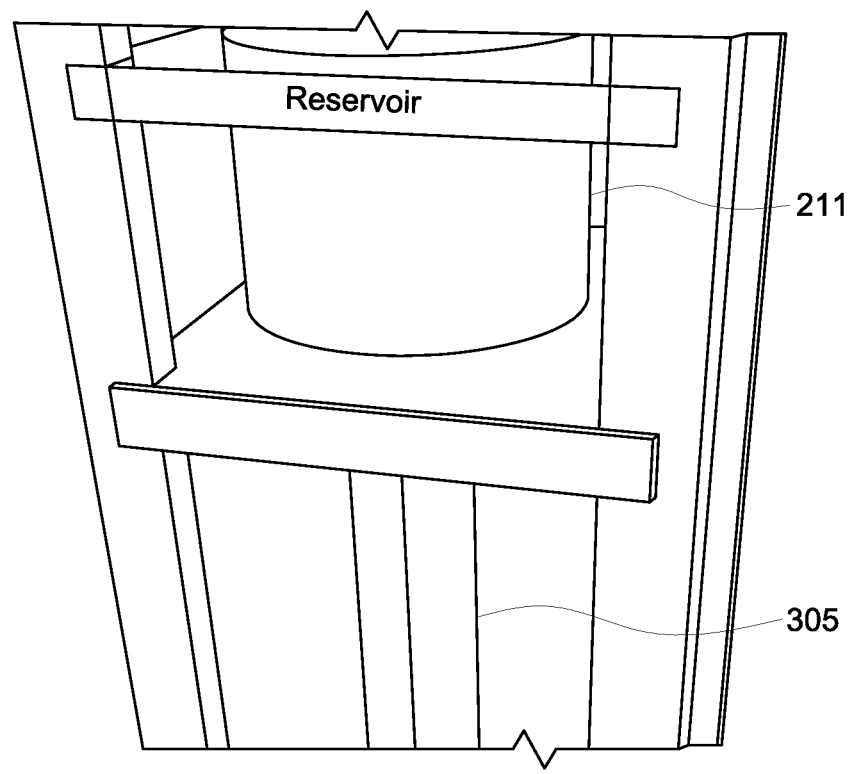
FIG. 8 is a partial view of the present invention showing a reservoir unit upper of the present invention.

In FIG. 8, the upper reservoir 211 is further shown. Water from the upper reservoir flows through penstock 305 at a flow rate of 9,000 liters per second to the hydraulic turbine (or impeller) 307 which provides torque to drive the 3-phase electric generator 309. The electricity generated from the hydroelectric unit is channeled to the transformer and combined with the electrical output from the fuel cell unit back to the electrolysis unit to continue the cycle while the net electrical output is put on the grid.

The electricity from the hydroelectric unit 307 and 309 as derived from mass transfer through a gravitational field within the penstock 305 compensates for the electrical output lost in the fuel cell unit in the form of a heat byproduct. The combination of electrical output from the fuel cell unit and the hydroelectric unit a) maintains the required electrical input of 20 Mw (in this example) to the electrolysis unit at the start of the process, and b) produces a net electrical output for uploading to the grid or use in other industrial processes. This can be described as:

$$N=FCe+P-ECe$$

where: N=Net electrical output in Mw; FCe=Fuel cell unit electrical output in Mw; P=Hydroelectric output in Mw; ECe=Electrolysis unit electrical output in Mw.

Hydroelectric output is derived by: $P=Q*p*g*H*n$ where: P=Mechanical power in Mw; Q=flow rate (m$^3$/s); g=Acceleration of gravity (m/s$^2$); H=height (m); n=global efficiency ratio (between 0.7 and 0.9).

In this study, ECe=20 Mw input (to produce 1,110 kg of hydrogen from 9,000 liters of water); FCe=16 Mw output with 20% heat loss (while producing 9,000 liters of water) so that P=20.92 Mw. Where the variables of P are set at: Q (flow rate)=9.81 (m$^3$/s)$^2$ or 9,000 l/s; H (height)=300 meters; FCe+P-ECe=16.92 Mw (a substantial net gain).

The mass transfer between the Electrolysis Unit and the Fuel Cell Unit is the enabling function of this process and the heart of the invention. This is considered novel over the prior art.

Figure 9:
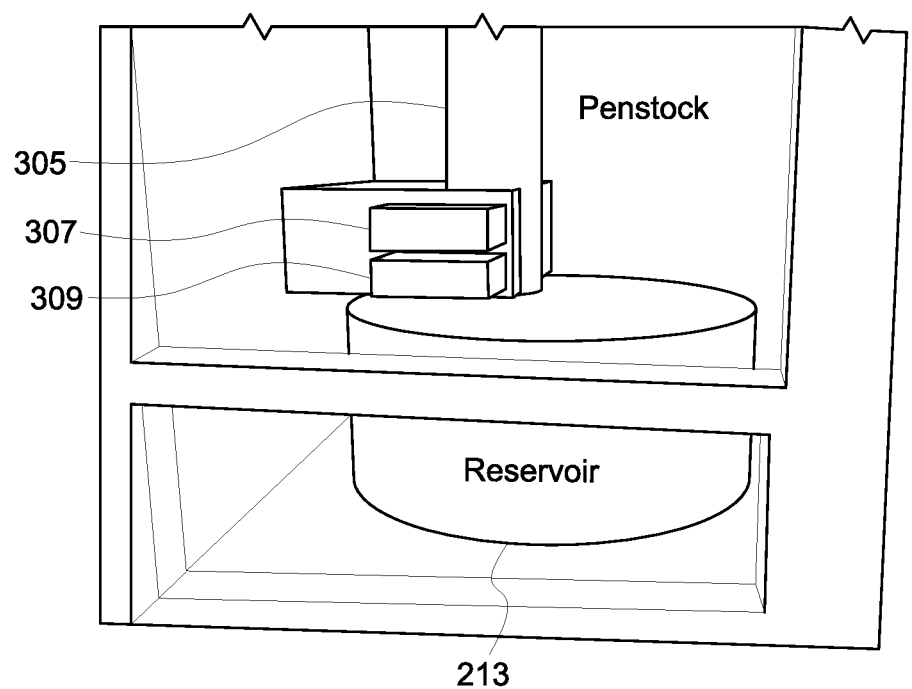
FIG. 9 is a partial view of the present invention showing a hydroelectric unit and a reservoir lower of the present invention.
Figure 10:
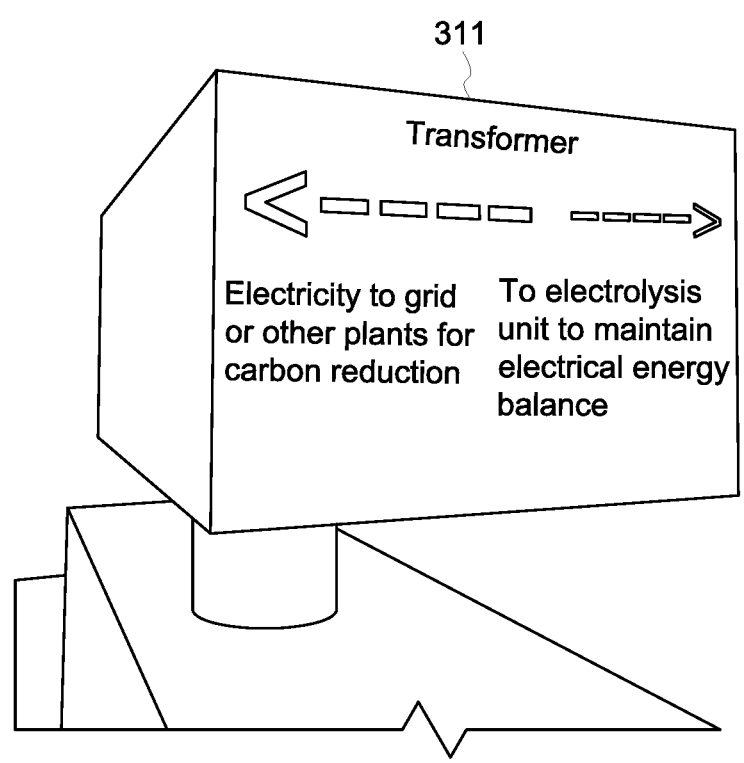
FIG. 10 is a partial view of the present invention showing an electric transformer and control unit of the present invention.
Figure 11:
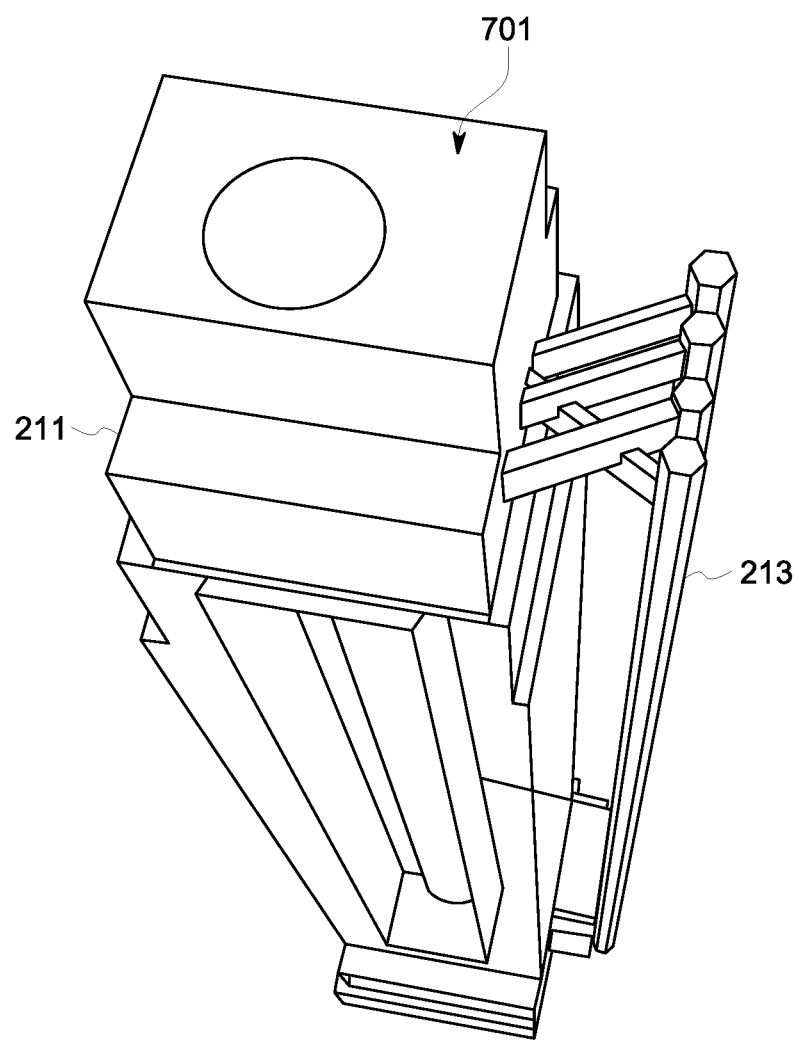
FIG. 11 is a top view of the present invention.

In FIG. 9, another view of the lower reservoir 213 in communication with the turbine 307 and generator 309 is shown for clarity. The transformer 311 is further shown in FIG. 10 with the associated functions. FIG. 11 further depicts the present invention from a top view for clarity.

It should be appreciated and understood that the system and process of the present invention provide for the generation of electricity without the combustion of fossil fuels, a continuously recycled distilled liquid water feedstock, maintaining continuous energy potential for virtual power storage, and generation of pure oxygen and electric power required for decarbonizing steelmaking, cement and fertilizer production (and other uses).

The system of the present invention further significantly reduces the need for massive resource and energy deployment for the installation of solar and wind technology infrastructures, thereby avoiding associated environmental/weather impacts and low-return financial investments.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A parallel mass transfer electric power generator system, comprising:
    an electrolysis unit configured to receive water and convert the water to hydrogen and oxygen, wherein the oxygen is an output configured for use in one or more applications;
    a fuel cell unit configured to receive the hydrogen from the electrolysis unit and recombine the hydrogen with oxygen received from air, thereby creating electricity and water;
    one or more outlets configured to allow for the water to free fall from the fuel cell unit to an upper reservoir;
    one or more pipes include a penstock wherein the water flows therethrough at 9,000 liters per second;
    a lower reservoir configured to receive the water from the upper reservoir via gravitational force and penstock to provide water to the electrolysis unit, the lower reservoir having a hydroelectric unit; and
    a transformer in communication with the hydroelectric unit and configured to provide an electricity net output;
    wherein the system is cyclical and provides for continuous recycling of the water and electricity to maintain energy/mass balance for the net generation of electricity.

2. The system of claim 1, wherein the hydroelectric unit comprises a generator and turbine.

3. The system of claim 1, wherein the electrolysis unit initially requires an input of energy.

4. A process parallel mass transfer electric power generator process, comprising:
    providing the system of claim 1;
    converting water to hydrogen and oxygen via the electrolysis unit, wherein the converting creates the output of oxygen for the one or more applications;
    transferring hydrogen from the electrolysis unit to the fuel cell unit;
    recombining, via the fuel cell unit, the hydrogen with oxygen received from the air to water, wherein there is an electrical output;
    transferring via free fall through the one or more pipes, the water from the fuel cell unit to the upper reservoir;
    transferring the water further from the upper reservoir via the penstock to the lower reservoir with a hydroelectric unit;
    creating the electricity net output via the transformer in communication with the hydroelectric unit; and
    transmitting the electricity within the system to continue the energy/mass cycle and to output net electrical gain to the grid.

* * * * *